July 29, 1941. F. E. WELD 2,250,923
ELECTRICAL CONTROL SYSTEM
Filed Jan. 2, 1940 3 Sheets-Sheet 1

Fig. 1

Witness
Paul F. Bryant

Inventor
Foster E. Weld
by his attorneys
Fish Hildreth Cary & Jenney

July 29, 1941. F. E. WELD 2,250,923
ELECTRICAL CONTROL SYSTEM
Filed Jan. 2, 1940 3 Sheets-Sheet 2

Fig. 2

Witness
Paul F. Bryant

Inventor
Foster E. Weld
by his attorneys
Fish Hildreth Cary & Jenney

July 29, 1941.  F. E. WELD  2,250,923
ELECTRICAL CONTROL SYSTEM
Filed Jan. 2, 1940  3 Sheets-Sheet 3

Fig. 3

Witness
Paul F. Bryant

Inventor
Foster E. Weld
by his attorneys
Fish Hildreth Cary ...

Patented July 29, 1941

2,250,923

UNITED STATES PATENT OFFICE 2,250,923

ELECTRICAL CONTROL SYSTEM

Foster E. Weld, Newton, Mass., assignor to The Gamewell Company, Newton Upper Falls, Mass., a corporation of Massachusetts Application January 2, 1940, Serial No. 311,983

14 Claims. (Cl. 171—97)

The present invention relates to electrical control systems and more particularly to systems for transferring electrical connections in a predetermined sequence.

The system is especially suitable for controlling charging circuits for storage batteries and will be so described herein, although it is suitable for effecting transfers in regular sequence between electrical circuits of any type. In its particular application for storage battery control the system finds special usefulness in connection with batteries for fire alarm systems.

According to one feature of the invention, there is provided a system whereby the charging circuit may be connected to the batteries (or more generally, whereby a common circuit may be connected to individual load circuits) in a particular sequence without danger of paralleling or establishing cross connections between the load circuits. In the preferred embodiment this feature of the invention comprises a plurality of stepping relays, each associated with an individual load circuit and having provision for transferring the connections in correct sequence.

The invention also contemplates a control system for automatically effecting the sequential operation of the stepping relays. The system is responsive to a dual control. For example, in the case of battery charging the transfer is controlled both by time and by battery voltage. Two embodiments of the control system are hereinafter described, these being fundamentally alike and differing primarily in means provided for accumulating idle time.

In the accompanying drawings

Fundamental circuit

Figure 1:
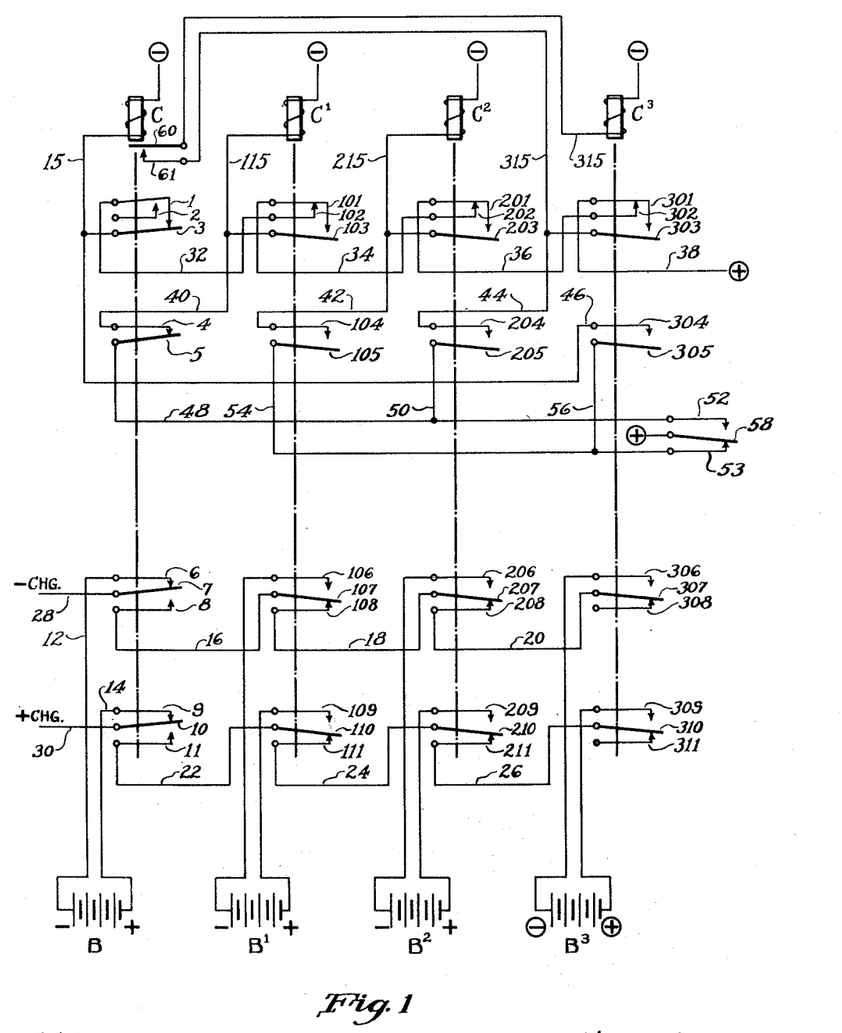
Fig. 1 is a diagram of the preferred form of stepping relay system for effecting the sequential circuit transfers.

The circuit which constitutes the principle of the invention is illustrated in Fig. 1, representing a sequential charge control system for a series of batteries. The batteries are shown at B, B', B² and B³, the first three being for the outlying box circuits and the fourth being the local battery for operating the central station equipment. The terminals of the box circuit batteries are indicated by conventional plus and minus signs, and the terminals of the local battery are indicated by plus and minus signs in circles. The local battery is used for operating the charge control relays, but to avoid complicating the diagram the actual connections are omitted and are simply designated by corresponding plus and minus signs in circles wherever necessary.

It is customary to charge the batteries continuously with a trickle charge and to apply a high-rate charge at intervals. In the accompanying drawings only the high-rate charge connections are shown.

The system shown in Fig. 1 comprises four stepping relays or charge control relays, one for each battery, designated C, C', C² and C³, each of which is connected at one end to the negative terminal of the local battery. Each relay is provided with a set of eleven contacts, designated 1 to 11 for the relay C, 101 to 111 for the relay C', 201 to 211 for the relay C², and 301 to 311 for the relay C³. The corresponding contacts are identical but contacts 2, 308 and 311 are not used although shown in the drawing for the sake of symmetry. Contacts ending in 3, 5, 7 and 10 are movable. Contact 1 makes on 2 when the corresponding relay is de-energized, and on 3 when the relay is energized, these contacts being of the make-before-break type and constituting holding circuits, as will be presently described. Contacts 4 and 5 are energization control contacts of the make and break type. Contact 7 is adapted to make selectively on 6 or 8, and contact 10 is adapted to make selectively on 9 or 11.

The negative terminal of battery B is connected to contact 6 by wire 12 and the positive terminal is connected to contact 9 by wire 14. The other three batteries are connected in exactly similar fashion to corresponding contacts of their relays. Contact 8 is connected to 107 by a wire 16, contact 108 to 207 by a wire 18, and contact 208 to 307 by wire 20. Similarly, contact 11 is connected to 110 by a wire 22, 111 to 210 by wire 24, and 211 to 310 by a wire 26. The negative terminal of the charging unit is connected by a wire 28 to the movable contact 7 of the first relay and the positive terminal charger is connected by a wire 30 with the movable contact 10 of the same relay. It will be seen that when the first relay C is energized, the terminals of the charger are directly connected to the proper terminals of the first battery B and are disconnected from all other batteries. When the relay C is de-energized and the relay C' energized, the negative terminal of the charger is connected to the negative terminal of battery B' through 28, contacts 7, 8, wire 16 and contacts 107, 106, while the positive terminal of the charger is connected with the positive terminal of the battery through 30, 10, 11, 22, 110 and 109. In the same fashion the charger is connected to $B^2$ by energization of $C^2$ or to $B^3$ by energization of $C^3$, assuming in each case that all preceding relays are de-energized.

Relay C is connected to its movable contact 3 by a wire 15, and the other relays are connected to their corresponding contacts by wires 115, 215 and 315. The connection 315 includes contacts for a purpose to be later described. Contact 1 is connected to 102 by a wire 32, contact 101 to 202 by wire 34, and contact 201 to 302 by wire 36. Contact 301 is connected to the positive terminal of the local battery by a wire 38. Contact 4 is connected to 103 by wire 40, contact 104 to 203 by wire 42, contact 204 to 303 by a wire 44, and contact 304 to 3 by a wire 46. Contacts 5 and 205 are connected by wires 48 and 50, respectively, to the upper fixed contact 52 of a transfer switch. Contacts 105 and 305 are connected by wires 54 and 56, respectively, to the lower fixed contact 53 of the transfer switch. The transfer switch has a movable contact 58 which is adapted for selective engagement with either of the fixed contacts, and which is itself connected to the positive terminal of the local battery. The connections 48, 50 constitute a stepping circuit which is connected through contacts of the odd-numbered relays (first, third, etc.) of the chain, and the connections 54, 56 constitute a second stepping circuit which is connected through contacts of the even-numbered relays (second, fourth, etc.) of the chain, whereby the relays may be sequentially energized by merely shifting the movable contact 58 of the transfer switch.

As shown in Fig. 1, the relay C is energized and therefore the charger is connected to the battery B. As there shown the relay C is maintained energized through a holding circuit which is traced from the negative terminal of the local battery through the winding of the relay, wire 12, contacts 3, 1, wire 32, contacts 102, 101, wire 34, contacts 202, 201, wire 36, contacts 302, 301 and wire 38 to the positive terminal of the local battery. At this time the movable contact 58 of the switch 52 is on the lower fixed contact and has no effect, since all circuits leading therefrom terminate on the open contacts 105 and 305.

After the battery B has been sufficiently charged, the charging control is transferred to battery B' simply by moving the contact 58 to the upper fixed contact of the switch 52. This may be done by any suitable means, such as a timing device, a voltage responsive device, or in any other suitable manner, but for the purposes of this preliminary description it may be assumed that the switch is simply thrown manually. An energizing circuit for the relay C' is then completed from the positive terminal of the local battery through the upper fixed contact of the switch 52, wire 48, contacts 5, 4, wires 40 and 112, and relay winding C' to the negative terminal of the local battery. The movable contacts of C' are then attracted. When 103 makes on 101, it establishes a holding circuit for C' and also breaks the previously traced circuit for relay C at contacts 101, 102. The holding circuit for C' need not be traced, since it will be remembered that the wire 34 to which contact 101 is connected is energized by a positive battery so long as relays $C^2$ and $C^3$ remain de-energized. The energization of C' and the consequent de-energization of C, transfers the charger connections to battery B', as previously described. Also, contact 105 closes on 104, but this produces no immediate effect because the movable switch contact 58 is now on the upper fixed contact 52.

After a time the switch contact 58 is thrown to the lower fixed contact so that a circuit is then completed through contacts 104, 105 to the relay $C^2$. In exactly the same manner as previously described, a holding circuit is established for $C^2$ through contacts 201, 203 while breaking the holding circuit for C' at 201, 202. In a similar manner the control can be finally transferred to relay $C^3$ by throwing the movable contact of the transfer switch to the upper fixed contact. In any case the energization of any relay through the transfer switch results in the establishment of a holding circuit for the newly energized relay and the interruption of the holding circuit for the preceding relay.

Finally, the control may be transferred back to the first relay C by throwing the switch to the lower contact whereby an energizing circuit for relay C is established through wire 56, contacts 305, 304, and wire 46. At the same time it is necessary to break the holding circuit for relay $C^3$, not only to de-energize $C^3$, but also to permit the previously traced holding circuit to be again established for relay C. This may be done in several ways, but is easily accomplished as shown in Fig. 1 by carrying the connection 315 of relay $C^3$ through a pair of extra contacts 60, 61 of the relay C. These latter contacts are caused to open only when the relay C is energized, and hence do not affect any of the operations previously described.

It will be seen that by merely operating the switch 58 alternately up and down the control is shifted stepwise in regular sequence from C through C' and $C^2$ to $C^3$, and thence back to C again, and consequently the charger is connected to the batteries in the same regular sequence. It will be noted that no more than one relay can be energized except momentarily. Furthermore, only one battery at a time can be connected to the charger, since the contacts ending in the numerals 6 to 11 automatically insure that the battery previously undergoing charge must be disconnected from the charger before the next battery is connected thereto, an important feature which prevents paralleling of batteries or discharging of one battery into another. It will be understood that the system is not limited to a battery charge control but that the batteries may be considered as representative of "load circuits" to which electrical connections may be shifted in sequential fashion.

The fundamental circuit described above may be modified to take care of special situations. For example, in a sequential battery charge control it is desirable to have the switch contact 58 under the control of a voltage responsive relay, or a timing device, or both. In a fire alarm battery system it is desirable to charge the batteries in sequence and disconnect the charger from any particular battery when the voltage reaches a predetermined value, and it is also desirable to transfer control to the next succeeding battery after a predetermined time, even though the battery under previous charge has not come up to the required voltage. Furthermore, the operations may be carried out in a full cycle of definite length. Thus, in a system involving eleven batteries each battery may be charged a maximum of two hours per day, and a 24-hour timer is used to start a new cycle at the same time each day. Under these circumstances, there will be some time in which the charger is idle and the idle time will necessarily vary in accordance with the time required for charging the individual batteries.

The complete systems hereinafter described involve the fundamental stepping feature of Fig. 1 together with means controlled by voltage and charging time for effecting the results above outlined. These systems are illustrated in two different embodiments; first, one in which the control is transferred from one battery to another immediately as dictated by the voltage control and the idle time is allowed to accumulate at the end of the full cycle and, second, one in which the control is transferred only at the ends of definite intervals, whether or not the charge for any particular battery has terminated by operation of the automatic voltage control. Furthermore, in both systems provision is made for an extended charge of at least one battery, for example, the local battery of a fire alarm system which has to carry a greater load than the others. These modifications will now be described in detail.

Figure 2:
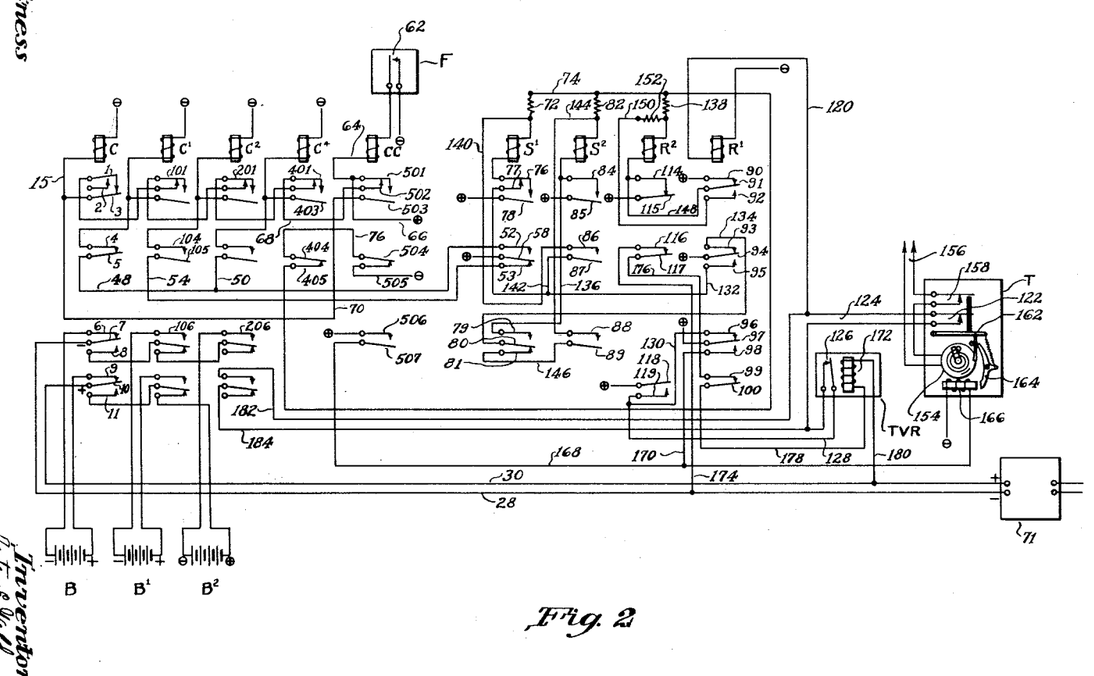
Fig. 2 is a diagram of a complete system as applied to battery charge control.

System of Fig. 2

The system of Fig. 2 is for controlling the charging of three batteries, namely, two line batteries B and B', and a local battery $B^2$, and may be applied to a system involving any odd number of batteries. The batteries are under the control of three charging control or stepping relays C, C' and $C^2$. These relays are identical with the corresponding relays of Fig. 1. A relay $C^4$ is provided for the purpose of controlling the system during the idle period when no batteries are undergoing charge. This relay has contacts 401, 402 and 403 corresponding to similarly numbered contacts of the other relays, and also a pair of contacts 404, 405 which are closed when the relay is de-energized. The relays are controlled by the transfer switch contacts 52, 53 and 58, identical with the correspondingly numbered contacts of Fig. 1, but here shown as part of a sequence control relay S'. The connections 48, 50 and 54 are as in Fig. 1, whereby the contacts 52 and 53 are connected with alternate stepping relays. There is, however, no connection corresponding to 56 of Fig. 1, from these contacts to the idling relay $C^4$. As will be presently described, the operation of the sequence control is determined by a voltage responsive device and also by an interval timer, so that when the battery undergoing charge comes to full charge the control is transferred to the next battery and this transfer is effected at the end of a predetermined interval in any event. The voltage responsive relay is indicated at TVR, which is of a well-known type having contacts operated when the battery voltage reaches a predetermined value, which value is dependent on the temperature. The interval timer is illustrated at T.

In addition to the interval timer, a full-cycle timer F is provided. This may conveniently operate on a 24-hour cycle so that the charge is transferred to the first battery B' for a certain time each day. It will be understood that the charging rate is usually set higher than the anticipated requirements of the batteries so that the use of a full-cycle timer is desirable to permit accumulation of idle time and thus to prevent overcharging.

The full-cycle timer F has contacts 62 which are normally open, but are adapted to close momentarily at the end of the cycle. One of the contacts is connected to the negative terminal of the local battery and the other to a cycle control relay CC, having contacts 501 to 505 identical with the contacts of the relay $C^4$; and also a pair of normally open contacts 506, 507 to control resetting of the interval timer. The relay winding is connected by a wire 64 with the contact 501, which in turn is connected by a wire 66 to the positive terminal of the local battery, so that the cycle control relay $C^5$ is energized whenever the contacts 62 close. Contact 401 of the idling relay $C^4$ connects by a wire 68 with contact 502, which is normally closed on 501. The normally down movable contact 503 is connected by a wire 70 with the movable contact 3 of the first relay C.

The charging lines 28, 30 are connected to the rectifier 71 and to contacts 7 and 10 of relay C, as in Fig. 1. The connections involving contacts ending in numerals 6 to 11 of relays C, C' and $C^2$ are substantially the same as in Fig. 1, except that the positive terminal of battery $B^2$ is connected direct to contact 111 of C', and contacts 209 and 210 of $C^2$ are utilized for another purpose to be described later.

The contact 58 by which the stepping of the relays is controlled is, as previously described, operated by the sequence control relay S'. One terminal of the relay winding is connected through a resistor 72 with a negative bus 74, which is connected to the contact 405 of relay $C^4$. The movable contact 404, which is normally closed on 405, is connected by a wire 76 with contact 504 of the cycle control relay CC, the fixed contact 505 being connected to the negative terminal of the local battery. When the relays $C^4$ and CC are de-energized, negative battery is supplied to the sequence control relay S' through the bus 74. In addition to the contacts 52, 53 and 58, the relay S' has a set of make-before-break contacts 76, 77 and 78, and another set of three contacts 79, 80 and 81, of which the middle contact 80 is adapted for selective engagement on 79 or 81 depending upon whether the relay is energized or de-energized.

A second sequence control relay $S^2$ is provided, having one end of its winding connected through a resistor 82 with the negative bus 74, and provided with three sets of contacts 84 and 85, 86 and 87, and 88 and 89, all of which are open when the relay is de-energized.

The operations of the sequence control relays are determined by an impulse starting relay R' which is controlled by the relay TVR and the timer T, as well as by an impulse terminating relay $R^2$. The relay R' has four groups of contacts: 90, 91 and 92 for controlling the operation of $R^2$; 93, 94 and 95 for controlling energization and de-energization of S' and $S^2$; 96, 97 and 98 for controlling the timer reset mechanism and for establishing a holding circuit for R'; and 99 and 100 for de-energizing the TVR winding at the proper times. Relay $R^2$ has three groups of contacts: 114 and 115 establishing its own holding circuit; 116 and 117 operating in conjunction with 99 and 100 of R'; and 118, 119 for controlling energization of R'.

One terminal of the relay R' is connected with the negative terminal of the local battery and the other terminal of the winding is connected by a wire 120 with the normally closed contacts 122 of the interval timer T. From the contacts 122 a wire 124 leads to the contacts 126 of the relay TVR and from these contacts a wire 128 leads to contact 119 of the relay R². Contact 118 is connected to the positive terminal of the local battery so that the relay R' is energized whenever the relay R² is de-energized and the series contacts 122 and 126 are closed. Upon energization of R' a holding circuit is established by a wire 130 from contact 119 to contact 96 of the relay R'. Contact 97 is connected to the positive terminal of the local battery.

From contact 95 of R' an impulse conductor 132 leads to the contact 77, which is closed on contact 76 of S' when that relay is de-energized, the contact 76 being directly connected to the relay winding. Upon de-energization of R' therefore the relay S' will be energized if negative battery is applied to the bus 74 through closure of contacts 404, 405 and 504, 505. Upon energization of S', contact 78 closes on 76, thus establishing a holding circuit for S' since the movable contact 78 is connected to the positive battery terminal.

Contact 93 of relay R' is connected by wire 134 with the movable contact 80 of the relay S'. Contact 79, upon which 80 closes when the relay S' is energized, is connected by a wire 136 with the winding of relay S², whereby that relay may be energized immediately following the energization of S', after which a holding circuit is established from the positive terminal of the battery through contacts 85, 84, the latter contact being directly connected with one terminal of the relay winding R². The other terminal of the winding is connected through a resistor 138 with the negative bus 74.

De-energization of the relays S', S² and R², under circumstances to be presently described, is under the control of shortcircuit connections, and it is for this reason that the resistors 72, 82 and 138 are used, in order to prevent shortcircuiting of the battery. The upper terminal of relay S' is connected by a wire 140 with contact 86 of the relay S², contact 87 being connected by a wire 142 with the conductor 132. It will be seen that if S' is being held up by its holding circuit it may be de-energized whenever S² is energized and R' is de-energized, a shortcircuit path for the relay S' being traced from the upper terminal of the relay winding through wire 140, contacts 86, 87, wire 142, wire 132, contacts 95, 94 to the positive terminal of the local battery, thence from such terminal through contacts 78, 76 and the relay winding S' back to the starting point.

The shortcircuit de-energizing path of the relay S² comprises a wire 144 leading from the upper terminal of relay S² to its contact 88, contact 89 being connected by a wire 146 with contact 81 of relay S'. Relay S² is thus de-energized when S' is down and R' is up, as may be seen by tracing a circuit from the upper terminal of S² through 144, 88, 89, 146, 81, 80, 134, 93, 94, 122, the positive battery terminal, contacts 85, 84 and winding S² back to the starting point. The contacts 88, 89 are merely to prevent drain on the battery through resistor 82 when R' is up and S² is down.

Contacts 90, 91 and 92 of the impulse starter relay R' are for the control of the impulse terminator relay R². Contact 90 is connected to the positive battery terminal and the movable contact 91 is connected by a wire 148 with one terminal of the relay winding R². Whenever R' is energized, R² will be energized if negative battery is fed to the bus 74. Upon energization of R² a holding circuit therefor is established at contact 114, 115. De-energization of R² is controlled by a shortcircuit path, including a wire 150 connected between the upper terminal of R² and contact 92 of R'. The wire 150 includes a resistor 152 to cause slow release of the relay R². It will be seen that relay R² will be de-energized whenever the shortcircuit path is closed by de-energization of R'.

The interval timer T comprises a motor 154 supplied by lines 156 through switch contacts 158 which are opened and closed simultaneously with contacts 122. The motor drives an arm 160 adapted to engage a switch opening lever 162. The arm 160 may be reset at any time to its starting position by a latch 164 controlled by a reset winding 166. Whenever the winding 166 is energized, the timing mechanism is reset, and then when the winding 166 is de-energized the timing cycle starts. If the timing mechanism runs without interruption for the period for which it is set, say two hours, contacts 122 and 158 are opened. The purpose of contacts 158 is to stop the motor when the timer operates. The winding 166 connected at one end to negative battery and at the other end through a wire 168 to contact 507 of relay CC, contact 506 being connected to positive battery. A connection 170 leads from wire 168 to contact 98 of R'. The resetting winding is therefore energized whenever R' is de-energized or CC is energized.

The voltage responsive relay TVR is provided with a winding 172 connected to opposite sides of the charging line 28, 30 through contacts 99, 100 of relay R' and 116, 117 of relay R², such contacts being closed only when the relays are energized. The complete connections include a wire 174 from the line 28 to contact 116, a wire 176 from contact 117 to contact 99, a wire 178 from contact 100 to one terminal of the TVR winding, and a wire 180 from the other terminal of the winding to the other line 30. The purpose of these connections is to de-energize the TVR winding and maintain contacts 126 closed during transfer periods and at other times when the charging lines are not connected to a battery. Since the TVR winding is responsive to voltage, it would be energized by the high charger voltage whenever the charging lines were not connected with a battery, if the above-mentioned connections were not provided.

*Operation of system of Fig. 2*

In Fig. 2 the charge is being applied to the battery B. Relay C is up and the charging lines are connected to battery B in the same manner as described for Fig. 1. Relays C', C² and C⁴ are down as is also relay CC since the full cycle timer contacts are open. Relays S' and S² are down and relay R² is up. Relay R' is up, as it must be under any conditions of actual charge, being held up through its holding circuit since contacts 122 and 126 are closed. It will be noted that contact 58 now engages contact 53 which is connected to the open contact 105 of relay C'.

If the battery becomes charged within the time allotted by the interval timer T, the winding 172 of relay TVR becomes energized and opens the contacts 126. If the battery is not brought up to full charge within the allotted time, contacts 122 of the interval timer are opened at the end of the timing cycle. So far as transfer of charge to the next battery is concerned, it is immaterial whether contacts 126 open before the end of the period or contacts 122 open at the end of the period. In either event, the energizing circuit for the relay R' is broken and the relay is de-energized. This cuts off the TVR winding at contacts 99, 100, also it closes contact 94 on 95, thus energizing the impulse conductor 132 and resulting in energization of the sequence control relay S'. Contact 91 making on 92 short-circuits the relay R² and allows it to de-energize slowly. De-energization of R' also closes the resetting circuit for the interval timer at contacts 97, 98, resulting in closure of the contacts 122 if they have been opened.

Energization of S' closes contact 58 on 52, thereby completing an energizing circuit for relay C' through contacts 4, 5 of relay C. C' is energized and locks up through its holding circuit and C becomes de-energized so that the charger is connected to battery B'.

Meanwhile, de-energization of the TVR winding through dropping of the contacts of R' and R² has insured that contacts 126 close even if they were previously open. As soon as contacts 118, 119 of R² close, relay R' becomes re-energized, thereby establishing its own holding circuit at 96, 97 and again energizing R² through contacts 90, 91. The timing interval starts when contact 97 opens from 98. Relay S² now becomes energized through a circuit leading from positive battery through contacts 94, 93, wire 134, contacts 80, 79, wire 136 and relay S² to the negative bus 74, after which the holding circuit for S² is closed at 84, 85. Re-energization of R' and R² again closes the circuit for TVR winding 172.

The charge of battery B' now proceeds under the control of relay C'. Under these conditions relays C, C², C⁴ and CC are down while all of the relays S', S², R' and R² are up.

After the charge on battery B' has run sufficiently to open either the contacts 122 or 126, the charge is transferred to the local battery B². The transfer is initiated by de-energization of relay R', followed by de-energization of R². Relay S' is de-energized through its short circuit path, thereby causing energization of relay C² through contacts 58, 53 and 105, 104. The timer is reset and then R' picks up again, followed by energization of R². Finally, relay S² drops because of the shortcircuit path established by de-energization of S' and energization of R'. Relay C² remains energized by its holding circuit so that the charging lines are connected to battery B³. As many batteries may be provided as desired and the charge will shift under the stepwise control from battery to battery. It will be observed that during charge the relays R' and R² are up, and during transfer they are down. Relays S' and S² are alternately up and down during charges on successive batteries.

The charge on battery B² proceeds as in the case of the preceding batteries. In this connection wherein the battery B² is the local battery of a fire alarm system, the control differs from that of the other batteries in that the charge on the local battery cannot be cut off by any operation of the interval timer T. The reason for this is that the local battery provides current for all the station equipment and therefore it usually requires a more extended charge. This result is accomplished through contacts 209 and 210, which are connected to short-circuit the timer contacts 122 when the relay C² is energized. Contact 209 is connected by a wire 182 with the wire 120, and the contact 210 is connected by a wire 184 with the wire 124. Operation of the interval timer will therefore have no effect on the charge of battery B². This feature may be applied to any one of the batteries, but obviously it is preferable to place it only on the last battery of the system, so that the additional charge will encroach only on the time which otherwise would be under the control of the idling relay C⁴.

After the local battery has been brought up to charge and the TVR contacts 126 open, relays R' and R² are de-energized in exactly the same manner as previously described. The sequence control relay S' is energized and a circuit for relay C⁴ is established through contacts 58, 52 and 205, 204, after which the holding circuit for C⁴ is established and relay C² becomes de-energized, thereby disconnecting all batteries from the charger. Furthermore, contacts 404, 405 of C⁴ are opened, thereby disconnecting negative battery from the negative bus 74. Consequently, relay S' drops and S² and R² cannot be energized during attraction of the idling relay. The impulse starting relay R' is energized as soon as relay R² drops and is thereafter held up by its holding circuit. It will be noted that the winding 172 of the TVR relay is de-energized and remains de-energized because contacts 116, 117 of R² remain open. During the momentary de-energization of R' the timer T is reset. The system then idles until such time as the full cycle timer F closes its contacts. It is possible that the interval timer T may operate during the idle period. In that event, relay R' simply drops, but the timer is immediately reset by the closure of contacts 97, 98 and the relay R' is immediately re-energized through contacts 118, 119 of the still de-energized relay R². The momentary de-energization of R' under such circumstances has no effect on any other part of the system.

At the end of the full cycle, contacts 62 of the timer F close and relay CC is energized through a circuit traced from the negative battery terminal through contact 62, winding CC, wire 64 and wire 66 to the positive battery terminal. Contact 503 makes on 501 and breaks the holding circuit for relay C⁴ at 502. The circuit is now traced to relay C from positive battery through 66, 501, 503 and 70. Energization of relay C again connects the charger to the first battery B.

The contacts 62 close only momentarily and as soon as they are opened, the relay CC is de-energized. The holding circuit for relay C may now be traced from the positive battery terminal and wire 66 back through the contacts of the several relays CC, C⁴, etc. During the energization of CC the negative bus connection is broken at 504, 505, but as soon as the contacts 62 are opened, the battery connection to the bus is restored at 505, 504 and 404, 405 so that relay R² may be energized, and relays S' and S² stand in readiness to be energized at the proper time although they remain de-energized during the charge of the first battery B.

At the time of momentary energization of relay CC, the interval timer T is reset by the closure of contacts 506, 507, thus insuring that the full interval shall be available for charging of the battery B.

It will be noted that the required charging time for the local battery $b^2$ may be sufficiently long to use up the remainder of the cycle. In such a case the full-cycle timer contacts 62 would close before the TVR contacts would open and the control would be transferred immediately to the first relay C without energizing the idling relay $C^4$ at all. This may be seen from the fact that when CC is energized by closure of the full-cycle timer contacts, contact 503 closes on 501, thereby breaking the holding circuit for $C^3$ and immediately energizing relay C' through the conductor 70. The interval timer T is reset by the closure of contacts 506, 507. Relays S' and $S^2$ which were down and relays R' and $R^2$ which were up during the charge on $B^2$, are to remain in the same condition for the charge on the first battery B and hence no disturbing operation occurs. The only action that occurs during transfer is the de-energization of the negative bus by opening of contacts 504, 505, and this results in momentary de-energization of $R^2$, as is necessary to disconnect TVR winding 172 from the charging lines at contacts 116, 117. As soon as contacts 62 open after their momentary closure, the negative bus is again energized, thus picking up relay $R^2$ and placing the system under proper control.

The normal operations of the several relays are summarized by the following schedule (omitting the condition of direct transfer from $B^2$ to B without idling):

|  | R' | $R^2$ | S' | $S^2$ |
| --- | --- | --- | --- | --- |
| Charge on B | Up | Up | Down | Down. |
| Transfer to B' | Down | Down | Up | Do. |
| Charge on B' | Up | Up | ---do--- | Up. |
| Transfer to $B^2$ | Down | Down | Down | Do. |
| Charge on $B^2$ | Up | Up | ---do--- | Down. |
| Transfer to idle | Down | Down | Up | Do. |
| Idle | Up | ---do--- | Down | Do. |
| Transfer to B | ---do--- | ---do--- | ---do--- | Do. |

The sequence of operations having been described, an explanation of the general function and purpose of the above mentioned relays may now be given. Relay R' remains continuously energized except during transfer periods when it is momentarily de-energized by the opening of contacts 122 or 126. The momentary de-energization serves to give the impulse for controlling the operation of S'. During this impulse, S' is energized through the impulse conductor 132 if it was previously de-energized, or it is de-energized through its shortcircuit path if it was previously energized; this relay is thus used to shift control of the stepping relays through contact 58. The relay $R^2$ remains energized during all periods of active charge but is slowly de-energized following de-energization of R' during a transfer period. The momentary de-energization of this relay in a transfer period terminates the impulse which was started by relay R' and is the means by which relay R' is re-energized. The relay $S^2$ operates in a fashion similar to S', being alternately up and down during active charging periods, and its function is to permit establishment of the shortcircuit path for the relay S' at the proper times. Likewise relay S' has contacts which determine establishment of the shortcircuit path for $S^2$. In general, the relays S' and $S^2$ are both in energized and de-energized condition simultaneously, except during transfer periods.

As in the case of the system of Fig. 1, this system utilizes an even number of charge control relays. An odd number of batteries is, however, used therewith since one of the relays must be employed to take care of the idling condition.

If the system should be rendered inoperative by the blowing of a fuse in the local battery circuit or by any other cause through which the relays are disconnected from their source of power, the system will not start up immediately upon repair of the fault, because the relays are all de-energized and there is no way to close an energizing circuit for any of them, except by manually setting the contacts. It will, however, start automatically at the beginning of a new cycle, as determined by the closure of the contacts 62 of the timer F. A circuit is then established through line 70 to the first charge control relay C, after which all other relays are caused to operate in the proper sequence. Although the system might be started manually, it is preferable to wait for the automatic start at the beginning of a new cycle, because correct sequential operation is then assured.

Figure 3:
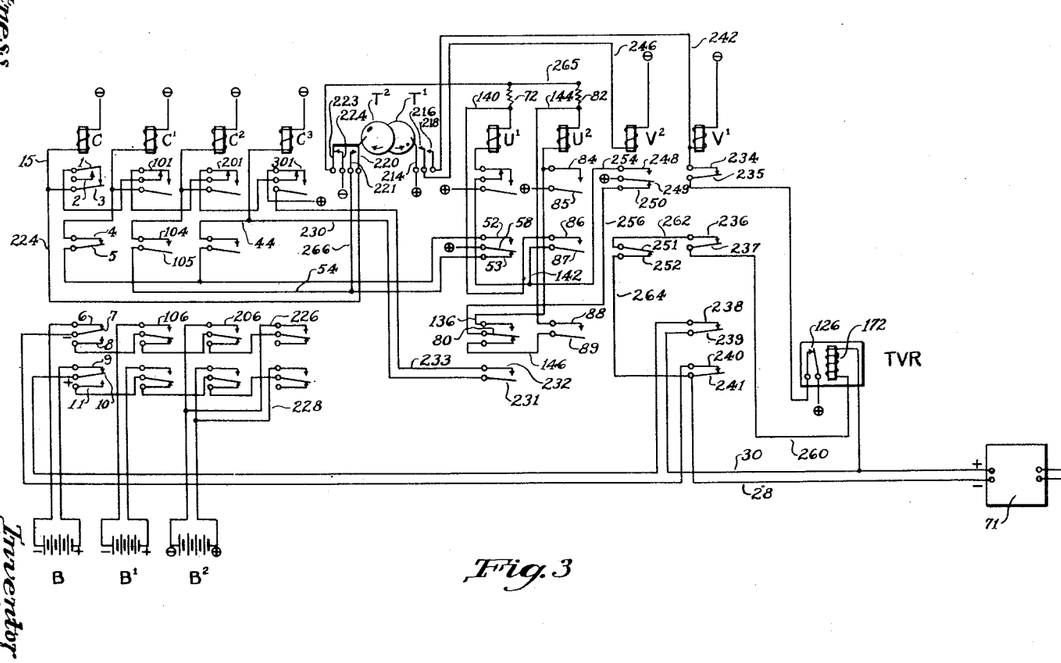
Fig. 3 is a diagram of a modified form of a complete system for battery charge control.

*System of Fig. 3*

The system of Fig. 3 is similar to that of Fig. 2, except that the transfer from one battery to the next occurs only at the end of the timing interval. The system is illustrated as having three batteries B, B' and $B^2$ of which the last is the local battery. These batteries are under the control of four stepping relays C, C', $C^2$ and $C^3$. To provide for greater charging on the local battery than on the other batteries, the battery $B^2$ is placed under the control of relays $C^2$ and $C^3$. Thus the local battery may be subjected to twice the charging time of any of the other batteries.

The stepping of the relays is under the control of two sequence control relays U' and $U^2$ corresponding to S' and $S^2$, a charger cut-off relay V' and an impulse controlling relay $V^2$. The charging times are under the control of an interval timer T' and a full-cycle timer $T^2$. The timer T' has three normally open contacts 214, 216 and 218, all adapted to close momentarily at the end of the timing interval, contact 214 being connected to the positive terminal of the local battery. The full-cycle timer $T^2$ has a pair of normally closed contacts 220, 221 adapted to close momentarily to determine the start of a new full cycle, and a pair of normally open contacts 222, 223 adapted to close at the same time. In the system shown, involving four stepping relays, the interval timer may be set to close its contacts every six hours and the timer $T^2$ to operate its contacts every twenty-four hours.

The contacts of the stepping relays are connected substantially as in Fig. 1, except in the folowing particulars: contact 3 of the first relay is connected by a wire 224 with contact 220 of the full-cycle timer $T^2$. Contacts 306 and 309 are connected in parallel with contacts 206 and 209, respectively, by wires 226 and 228, in order that the charge may be applied to the local battery $B^2$ whenever $C^2$ or $C^3$ is energized. Connection 44 is not led to contact 303 directly, but the connection is carried through a wire 230, contacts 231, 232 of relay U', and a wire 233 to contact 303. The purpose of contacts 231, 232 is to break the holding circuit for $C^3$ when transfer back to C is to be effected, and these contacts therefore take the place of contacts 60, 61 of Fig. 1.

Relay U' has in addition to the contacts 231, 232 three sets of contacts identical with those of the relay S' of Fig. 2, and such contacts are similarly numbered. The sequence control contacts 52, 53 and 58 are connected with the stepping relays through wires 48, 50 and 54 exactly as in Fig. 2. Contacts 76, 77 and 78, as well as contacts 79, 80 and 81, are the same as in Fig. 2 and for the same purposes.

The relay U² has contacts 84 and 85, 86 and 87, and 88 and 89 as in Fig. 2.

The relay V' has four sets of contacts, namely, 234 and 235, 236 and 237, 238 and 239 and 240 and 241, all of which are closed when the relay is energized. One terminal of the relay is connected to the negative terminal of the battery. The other terminal of the relay is connected by a wire 242 with contact 216 of the interval timer T' and by a wire 243 with its own contact 234. Contact 235 is connected by a wire 244 with the TVR contacts 126, through which the circuit may be completed to the positive terminal of the local battery. Relay V' is thus energized when the timer contacts close and is maintained energized by a holding circuit through contacts 126. Contacts 236 and 237 are in series with the TVR winding 172 as will be presently described. Contacts 238 and 239 are placed in series with the positive charging line 30, and contacts 240 and 241 are placed in series with the negative charging line 28, so that when these contacts are open, the charger is disconnected from the battery.

The relay V² is connected at one terminal to negative battery and at the other terminal to timer contact 218 by a wire 246. This relay has a set of contacts 248, 249 and 250 and another set of contacts 251 and 252. Contact 248 is connected to contact 77 by a wire 254, corresponding to the impulse conductor 132 of Fig. 2. Contact 249 is connected to positive battery and contact 250 is connected by a wire 256 with contact 80 of U'.

The circuit of the TVR winding is traced from the positive charging line 30 through a wire 258, the winding 172, a wire 260, contacts 237, 236 of V', a wire 262, contacts 251, 252 of V², and a wire 264 to contact 241 which connects with the negative charging line 28. Whenever V' is de-energized or V² is energized, the TVR winding is disconnected from the charging lines.

Relay U' is connected through a resistor 72, and relay U² through a resistor 82, with a wire 265 running to contact 223 of timer T². Contact 222 is connected to the negative terminal of the local battery. As in the case of Fig. 2, de-energization of U' and U² is accomplished by shortcircuit connections. For U' the shortcircuit path includes connections 144 and 146 connected in exactly the same manner as for the relays S' and S² of Fig. 2. The energizing connection 136 for U² is likewise the same as the similarly numbered connection for S² of Fig. 2.

The full-cycle timer contact 221 is connected by a wire 266 with the connection 54 which leads from contact 53 of relay U' to contact 105 of relay C'.

*Operation of system of Fig. 3*

As shown in Fig. 3, the charge is being applied to the first battery B, relay C is up and the charging lines are connected to battery B in the same manner as described for Fig. 1. Relays C', C² and C³ are down, relay V' is up as it must be for any active charge, V² is down, and the sequence control relays U' and U² are down.

When the battery becomes fully charged, contacts 126 of the TVR relay open, and this breaks the holding circuit for relay V'. De-energization of V' opens the charging lines at 238, 239 and 240, 241, also it disconnects the TVR winding from the line at 236, 237. Nothing further happens until the interval timer T' closes its contacts 214, 216 and 218, then relays V' and V² are energized. Relay V' is locked up by its holding circuit. Energization of V² breaks the TVR winding circuit at 251, 252, also it closes contact 249 or 248, thereby energizing relay U' through the impulse conductor 254, after which the holding circuit for U' is established at contacts 78, 76. As soon as U' is energized, stepping relay C' is energized through contacts 58, 52 and 5, 4 as previously described. When the contacts of timer T' open, relay V² drops and closes an energizing circuit for relay U² through contacts 249, 250, wire 256 and contacts 80, 79, following which the holding circuit for U² is established at 85, 84. Furthermore, the circuit of the TVR winding 172 is completed through 251, 252. The charge then proceeds on battery B'. Until the timer T' again operates, relays U' and U² are maintained energized.

It will be noted that even if the TVR relay does not operate within the allotted time, the interval timer T' on closing its contacts will energize relay V² and accomplish the transfer in exactly the same fashion. No operation of V' is necessary to effect a transfer, the purpose of this relay being to cut off the charge if the battery reaches the proper voltage before the end of the timing interval.

At the proper time for transfer from B' to B² the contacts of the timer T' again close and V² is again energized. Upon closure of contact 249 on 248 a shortcircuit path for U' is established from the upper end of the winding through 140, 86, 87, 142, 254, 248, 249, positive battery terminal, contacts 78, 76 and back through the winding to the starting point. U' being thus de-energized drops its contacts and closes an energizing circuit for C² through contacts 58, 53 and 105, 104. As soon as V² drops by opening of the timer contacts, a shortcircuit path for U² is established from the upper end of the winding through 144, 88, 89, 146, 81, 80, 256, 250, 249, positive battery terminal, 85, 84 and the relay winding back to the starting point. The charge on battery B² now proceeds with relay C² energized. U' and U² are now down.

At the end of the interval for control by C², control is transferred to C³ upon closure of the contacts of T' and the second charge on the battery B² proceeds with relay C³ attracted. During this interval relays U' and U² are up.

At the end of the full cycle the contacts of T' close momentarily, and contacts 220, 221 of T² close and contacts 222, 223 open. Since negative battery is removed from relays U' and U² by the opening of the last named contacts, these relays are de-energized. Relays V' and V² are energized through the contacts of T' as at the end of any timing interval. It will be noted that relay U' would in any event be de-energized through its shortcircuit path upon energization of V² exactly as at the end of any timing interval. Contacts 222, 223 are therefore superfluous for normal operation of the system, but they are used to take care of an abnormal condition, as will hereinafter be described. When relay U' is de-energized, the holding circuit for stepping relay C³ is broken at contacts 231, 232. An energizing circuit for the first stepping relay C is established from the positive battery terminal through contacts 58, 53, wire 54, wire 266, closed contacts 220, 221 of the time T², and wire 224 through the winding of relay C to the negative battery terminal. Upon attraction of the contacts of relay C, its holding circuit is again established and the charging connections are transferred to the first battery B. As soon as the contacts of T' open, relay V² is de-energized, thus closing contacts 251, 252 and allowing the winding 172 of the TVR relay to be connected across the charging lines. At some time thereafter the timer T² allows its contacts to be restored to normal condition, thereby again applying negative battery to relays U' and U² in readiness for the next operation of the interval timer T'. The time during which the contacts of the full-cycle timer T² are actuated is longer than the time of closure of the contacts of the interval timer T', in order to make sure that negative battery cannot be applied to the relay U' when relay V² is energized, because in that event an energizing circuit for U' would be established through contacts 248, 249 of V² and the sequence control would be destroyed. After timer T² releases its contacts the system is in the condition shown in Fig. 3 and succeeding charging cycles proceed as previously described.

As stated above, the contacts 222, 223 of timer T² are superfluous for normal operation. The upper ends of resistors 72 and 82 might be directly connected to the negative battery terminal and so long as the system remained in proper condition it would operate in the correct sequence. Such a system, however, would not necessarily be self-starting. Assuming that the power supply should be lost, as by the blowing of a fuse, then at the time of repairing the fault the relays U', U², V' and V² would start their sequential operations, but the stepping relays would be de-energized until the beginning of the next full cycle. Whether or not the cycle would start correctly would depend on the sequence in which relays U' and U² had been previously operated. It is necessary that at the start of the full-cycle the relay U' should be de-energized and should remain de-energized throughout the first charging interval. The contacts 222, 223 make sure that both relays U' and U² are de-energized and also that these relays cannot be again energized by the operation of any other elements of the system until the timer T' dictates the transfer to the next stepping relay. The timer T², therefore, not only determines the start of the full cycle, but insures that the relays shall be started in proper sequence regardless of any disturbances which might have occurred in the preceding cycle.

As in the system previously described, the stepping relays are of an even number. Any number of relays may be employed, the upper contact 52 of the transfer switch being connected to contacts 5, 205, etc., of the first, third, etc., relays, and the lower contact being connected to contacts 105, etc., of alternate relays, no connection, however, being made to the final relay of the series. In the particular system shown in Fig. 3, an odd number of batteries is provided, but the battery connections are even in number because the final battery is subjected to a double charging interval. One or more of the relays may be connected for idling, if an odd number of battery connections are employed. For example, the final relay C³ could function as an idling relay merely by omitting the connections 226 and 228.

Conclusion

The invention above described comprises two main features: first, the stepping system illustrated by Fig. 1; and, second, the automatic sequence control exemplified by the modifications of Figs. 2 and 3.

The stepping system shown in fundamental form in Fig. 1 utilizes the series connections of relay contacts to transfer control successively from one relay to another. Although this system is illustrated as applied to battery charging, it will be understood that it can be used for any purpose in which electrical connections are established sequentially from one circuit to different "load" circuits. The systems of Figs. 2 and 3 involve means whereby the transfer from one load circuit to another is under the joint control of a timing mechanism and means responsive to the condition of the load circuits themselves. These systems are particularly suitable for battery charging and serve to maintain the batteries in proper condition with a minimum of supervision. Having thus described the invention, I claim:

1. A sequential control system comprising a plurality of stepping relays, each having a group of holding circuit contacts and a group of energization control contacts, a transfer switch having contacts connected to alternate groups of energization control contacts, the energization control contacts of each relay being connected to the next succeeding relay, and holding circuit connections to the holding circuit contacts to establish a holding circuit for a relay energized by the energization control contacts and to break the previously established holding circuit for the preceding relay.

2. A sequential electrical transfer system comprising a plurality of relays, a plurality of holding circuit contacts for each relay, means for energizing the first relay, energizing circuit contacts for the several relays each connected to the succeeding relay, a transfer switch having contacts connected with energizing circuit contacts of alternate relays, and holding circuit connections through the holding ircuit contacts of the relays to maintain any relay, when once energized, in energized condition, said holding circuit contacts having provision, upon energization of the next succeeding relay for breaking the holding circuit for the previously energized relay and for establishing the holding circuit for the newly energized relay.

3. A sequential transfer system comprising a plurality of relays, holding circuit contacts for each relay including a movable contact connected with its corresponding relay and a pair of normally closed fixed contacts adapted to be separated when the movable contact closes on one of the fixed contacts, series connections of said fixed contacts of the several relays to form a holding circuit, and a source of potential connected with one of the fixed contacts of the final relay and with all of said relay windings.

4. An electrical control system comprising a relay, an impulse device, a holding circuit for the relay, means controlled by the impulse device to energize the relay if de-energized and to short circuit the relay if energized, and a second relay controlled by the first relay having contacts to control the short circuit path for the first relay.

5. An electrical control system comprising two sequence control relays each having contacts to establish individual holding circuits therefor, a shortcircuit de-energizing path for each relay including contacts of the other relay, and impulse means to effect de-energization of said relays following a period of simultaneous energization thereof and to effect energization of said relays following a period of simultaneous de-energization thereof.

6. An electrical control system comprising two sequence control relays each having contacts to establish individual holding circuits therefor, a shortcircuit de-energizing path for each relay including contacts of the other relay, impulse starting means to change one of the sequence control relays from energized to de-energized condition or vice versa, and impulse terminating means to effect a subsequent similar change in the condition of the other relay.

7. An electrical transfer system comprising a common circuit and a plurality of load circuits, means for transferring connections sequentially from one load circuit to another, means responsive to load circuit conditions for operating the transfer means to effect transfer to the next circuit, an interval timer to operate the transfer means at the end of a predetermined time interval notwithstanding failure of said responsive means to operate, a full cycle timer, and idling means to accumulate idle time at the end of a full cycle.

8. An electrical transfer system comprising a common circuit and a plurality of load circuits, means including a set of stepping relays for transferring connections from the common circuit to the load circuits in sequence, means responsive to load circuit conditions for disconnecting a load circuit from the common circuit and for operating the stepping relays to transfer the connection of the common circuit to the next load circuit, an interval timer to effect such transfer notwithstanding failure of said responsive means to operate within a predetermined time, a full-cycle timer, and an idling relay constituting one of the set of stepping relays to accumulate idle time at the end of the full cycle.

9. A sequential transfer system comprising a plurality of relays, holding circuit contacts for the several relays, holding circuit connections for maintaining any relay, when once energized, in energized condition, means including the energized relay for energizing the relay next succeeding, means operated by energization of said succeeding relay for establishing a holding circuit for itself and for breaking the holding circuit of the previously energized relay, a full-cycle timer, and means operated under control of the full-cycle timer to break a previously established holding circuit and to energize the first of the relays.

10. A sequential control system comprising a plurality of stepping relays, a stepping circuit for odd-numbered relays, a stepping circuit for even-numbered relays, a transfer switch for alternately energizing the stepping circuits, and contacts on each relay for connetcing one of said stepping circuits with the relay next succeeding an energized relay upon shifting of the transfer switch.

11. A sequential control system comprising a plurality of stepping relays each having energization control contacts connected with the next succeeding relay, a stepping circuit connected with the energizing control contacts of odd-numbered relays, a stepping circuit connected with the energizing control contacts of even-numbered relays, and a transfer switch connectable to one or the other of the stepping circuits to cause energization of the relays successively by alternately connecting the switch to said stepping circuits.

12. A sequential control system comprising a plurality of stepping relays, a stepping circuit for odd-numbered relays, a stepping circuit for even-numbered relays, a transfer switch for alternately energizing the stepping circuits, contacts on each relay for connecting one of said stepping circuits with the relay next succeeding an energized relay upon shifting of the transfer switch, holding circuit contacts for each relay, and holding circuit connections including said contacts and operating to establish a holding circuit for a newly energized relay and to break the holding circuit of the previously energized relay.

13. An electrical control system comprising two sequence control relays each having holding circuit contacts, a short circuit de-energizing path for each relay including contacts of the other relay, an impulse starting device having a pair of contacts connected with one of the sequence control relays to energize said relay if de-energized and to close the short-circuit de-energizing path therefor if energized, and means acting through energization or de-energization of said relay to energize or de-energize, respectively, the other sequence control relay.

14. An electrical control system comprising a first sequence control relay, a second sequence control relay, an energizing circuit for the second relay including contacts of the first relay, a short-circuit de-energizing path for each relay including contacts of the other relay, an impulse starting device having a pair of contacts connected with the first relay to energize said relay if de-energized and to close the short-circuit de-energizing path if energized, and means acting after energization of the first relay for energizing the second and acting after de-energization of the first relay for closing the short-circuit de-energizing path for the second relay.

FOSTER E. WELD.